Figure 1:
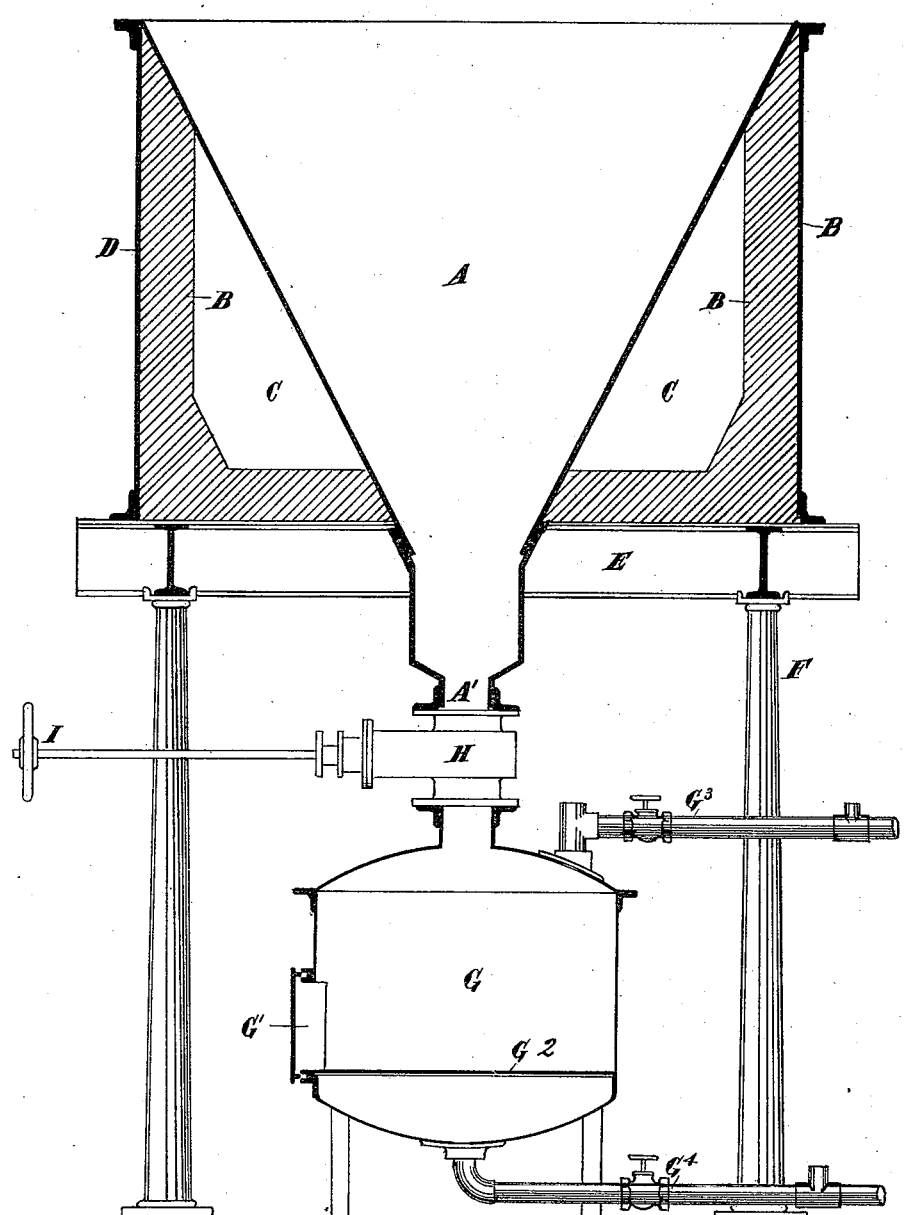

(No Model.) 4 Sheets—Sheet 1.

A. DOMEIER & O. C. HAGEMANN.
PROCESS OF RECOVERING GLYCERINE FROM SPENT SOAP LYE.

No. 428,468. Patented May 20, 1890.

(No Model.) 4 Sheets—Sheet 2.

A. DOMEIER & O. C. HAGEMANN.
PROCESS OF RECOVERING GLYCERINE FROM SPENT SOAP LYE.

No. 428,468. Patented May 20, 1890.

(No Model.) 4 Sheets—Sheet 3.

A. DOMEIER & O. C. HAGEMANN.
PROCESS OF RECOVERING GLYCERINE FROM SPENT SOAP LYE.

No. 428,468. Patented May 20, 1890.

(No Model.) 4 Sheets—Sheet 4.

A. DOMEIER & O. C. HAGEMANN.
PROCESS OF RECOVERING GLYCERINE FROM SPENT SOAP LYE.

No. 428,468. Patented May 20, 1890.

UNITED STATES PATENT OFFICE.

ALBERT DOMEIER AND OTTO CHRISTIAN HAGEMANN, OF LONDON, ENGLAND, ASSIGNORS TO JAMES S. KIRK & CO., OF CHICAGO, ILLINOIS, AND ALBERT DOMEIER, OF LONDON, ENGLAND.

PROCESS OF RECOVERING GLYCERINE FROM SPENT SOAP-LYE.

SPECIFICATION forming part of Letters Patent No. 428,468, dated May 20, 1890.

Application filed June 6, 1889. Serial No. 313,367. (No specimens.) Patented in France April 24, 1889, No. 197,713.

*To all whom it may concern:*

Be it known that we, ALBERT DOMEIER, merchant, and OTTO CHRISTIAN HAGEMANN, chemical engineer, both of London, England, have invented certain new and useful Improvements in the Manufacture of Glycerine from Spent Soap-Lyes, (for which we have obtained French patent No. 197,713, dated April 24, 1889,) of which the following is a specification.

The object of our invention is an improved process of boiling or concentrating the soap-lye in order to obtain the crude glycerine therefrom.

During the concentration of spent soap-lye for the manufacture of glycerine therefrom a large amount of mineral matter, principally chloride of sodium, separates out from the liquor, and such separation or precipitation of mineral matter forms a serious obstacle in the way of successful working. The mineral matters being allowed to accumulate in the vessel wherein the said boiling or concentration is carried on, they cake together, and the cakes or scales thus formed inclose much glycerine, which is thus lost, and if the accumulation of such mineral matters takes place in close proximity to heated surfaces or superheated steam the glycerine is readily damaged by such portion of it as may be inclosed in the cakes or scales or in contact therewith getting too large a share of heat and thus becoming burned or decomposed. Even with the best attention given to the frequent removal of the deposit by taking it directly out of the boiling glycerine-liquor such objectionable accumulation cannot be completely avoided. In such case the removal of the deposit out of the boiling glycerine-liquor necessarily entails the removal also of a considerable quantity of the concentrated liquor or glycerine, and by this loss of liquor various disadvantages are caused, such as irregular working, boiling over and loss of heat, and falling of temperature through copious displacement of concentrated liquor or glycerine by liquor varying in temperature and strength. Then the glycerine or concentrated liquor once out of the apparatus must be recovered from the precipitated mineral matters with which it is mixed, and as the liquor thus taken out in the course of the process varies in strength and quality it is disadvantageous to return them to the apparatus without being specially treated or kept separate. It is also equally disadvantageous to merely pass a considerable quantity of liquor through the apparatus by such excessive takings out and fillings in, inasmuch as the progress of concentration is thus delayed and the glycerine kept longer under the influence of the operation.

In the feeding of the apparatus with fresh glycerine liquor it is found that if such liquor is possessed of a less degree of concentration than the boiling liquor already in the apparatus a very objectionable boiling over is often caused through the less-concentrated liquor giving off its excess of water suddenly upon mixing with the more highly concentrated boiling contents of the apparatus.

We are aware that it has been proposed to treat liquors not containing glycerine, but containing crystallizable salts for the recovery of the latter, by subjecting the liquor to reverberatory heat in open flat-bottomed pans having pockets connected by passages controlled by plugs, and to which passages the salts thrown down on the bottom of the pan are conveyed by hand-rakes or similar mechanical appliances, and said pockets have been provided with strainers and doors for removing the salts; but in such process the sole object is the evaporation of the water and the recovery of the crystallizable salts. This process is inapplicable to our purposes because our most valuable product—*i. e.*, the glycerine—would be injured by the direct contact with the gases of combustion, the salts would be rendered unfit for future use by their admixture with particles of burned and insoluble matter, and the salts, instead of falling out of the liquor by gravity directly as formed, when attempted to be removed by mechanical means to the discharge-orifices, would, by the adhesion of particles to the bottom of the pan, cake together and inclose much glycerine which it would be difficult to recover. Besides these difficulties, the salt would form on the surface of the liquor, particularly near the walls of the pan, and, being there subjected to the direct action of the heat, the glycerine adhering thereto would burn and form into clots, which, passing through the body of the liquor, would spoil the latter.

The object of this invention is to overcome these difficulties and to obtain the crude glycerine from the raw material in a more perfect manner than has hitherto been accomplished.

In carrying out our invention we free the boiling portion of the glycerine-liquor from the mineral precipitates as they are formed by removing them to another and quiescent portion of the liquor, both portions being separable at need, thereby temporarily cutting off the boiling liquor from the precipitates, which allows of the latter being thoroughly dealt with and at leisure, and also allows of the fresh liquor being fed into the quiescent portion instead of into the boiling portion of the liquor. We therefore so arrange our apparatus that it is made to consist of two portions, both filled with the same liquor, the one portion heated and the other out of the influence of the heat, the precipitates forming in the heated or boiling portion passing as formed into the portion not heated, and both portions being separarable at will by a convenient means—such as a valve or diaphragm—so that complete removal of the accumulated precipitates can be effected with thoroughness and at leisure without at the same time taking out of the apparatus a copious volume of concentrated glycerine liquor, and by feeding any fresh liquor into that part of the apparatus not heated we are enabled to cause a gradual mixing of such freshly-fed liquor with the boiling portion. We also provide in some forms of apparatus for the washing of the precipitated mineral matters to free them from the glycerine-liquor or glycerine mixed with them.

The apparatus we are now about to describe is designed for the purpose of carrying out our process as above described, and forms the subject of a separate application for Letters Patent of the United States filed by us September 9, 1889, Serial No. 323,372; but it will be readily understood that other forms of apparatus may be devised for the purpose.

Figure 2:
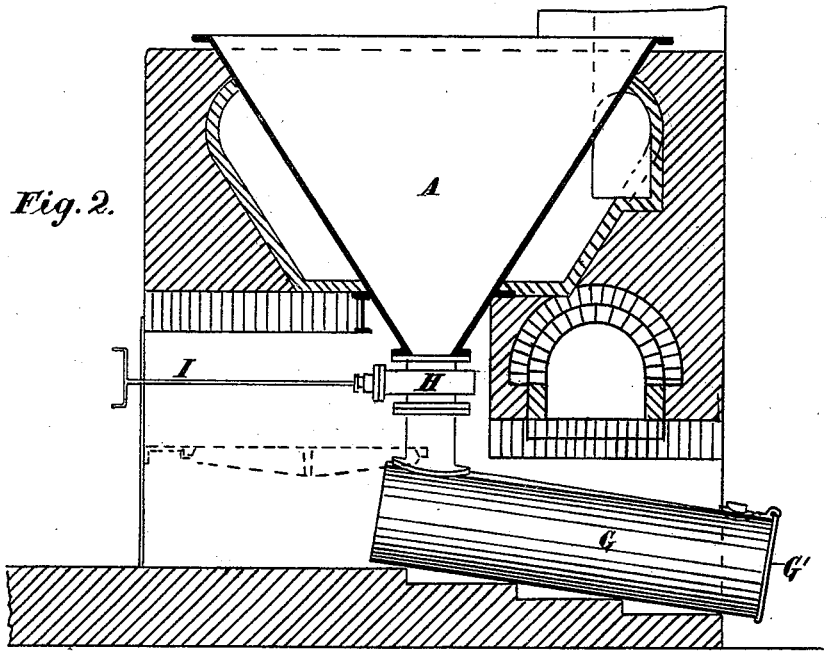
Figure 3:
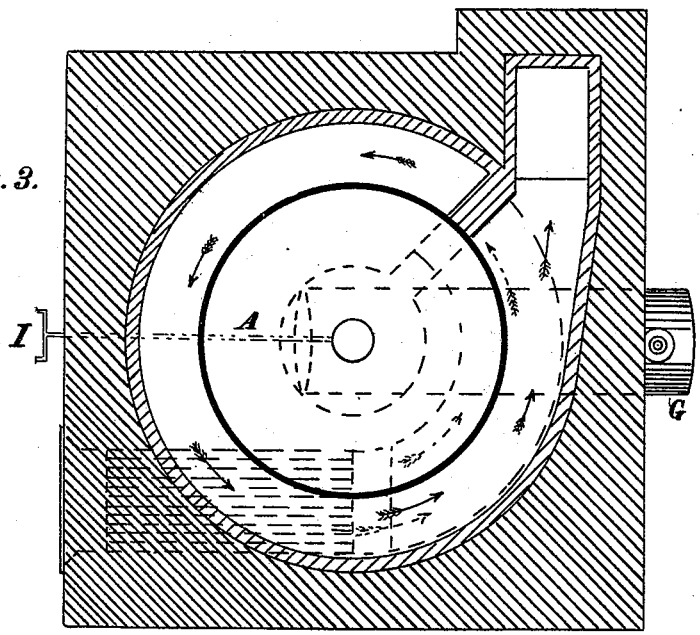
Figure 4:
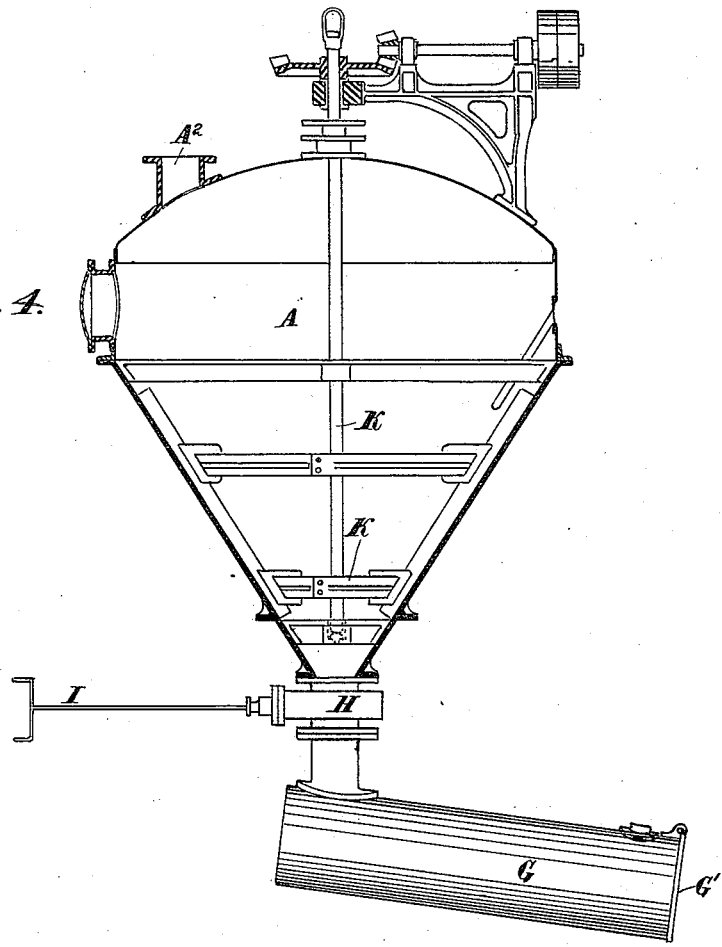
Figure 5:
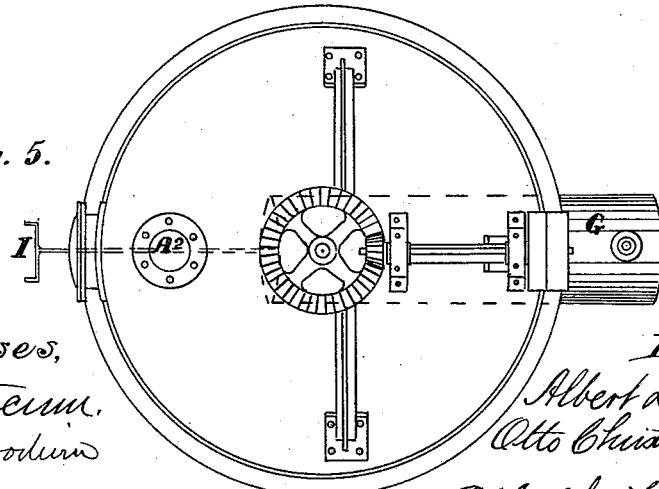
Figure 6:
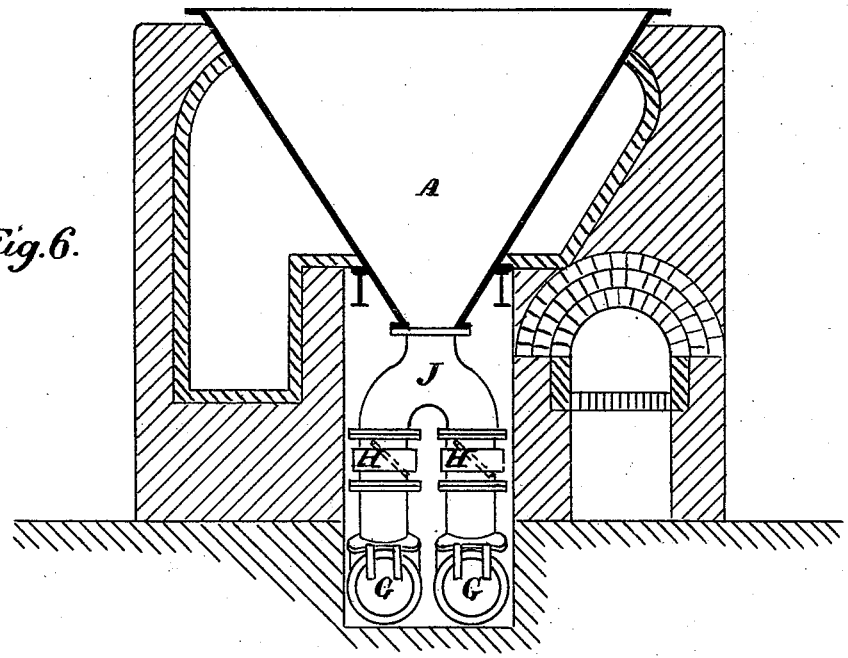
Figure 7:
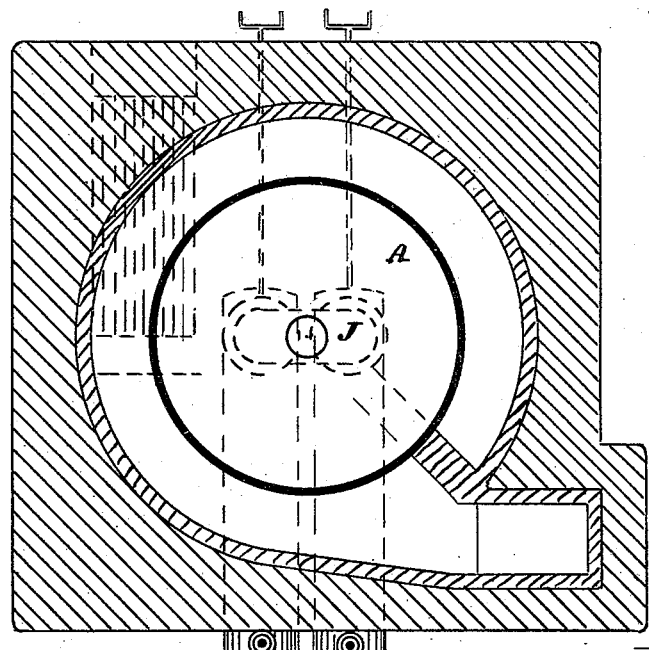

In the accompanying drawings, Figure 1 represents a sectional elevation of a complete apparatus adapted for the purpose. Figs. 2 and 3 are respectively an elevation, partly in section, and a plan of an open apparatus set in brick-work. Figs. 4 and 5 are respectively a plan and sectional elevation of a similar closed-in apparatus, but without the brick-work, and provided with a mechanical scraper. Fig. 6 is a sectional elevation of one form of the apparatus, and shows how the quiescent portion of the liquor may be disposed when the part of the apparatus not heated is in duplicate, the one such duplicate part to have connection with the boiling liquor, while the other is cut off for the removal of the precipitates or charging with fresh liquor. Fig. 7 is a sectional plan of Fig. 6.

A is the boiler or vessel in which the concentration is effected, B the inclosing brick-work or fire-clay, and C the fire-space.

D are metal plates forming the outer walls of the apparatus.

E and F are respectively girders and columns to carry the apparatus.

G is the part into which the precipitated salts fall as formed, and which can be separated from A by the closing of the valve H by means of the hand-wheel I.

$G'$ is a door through which the collected matter in G can be removed, and $G^2$ a strainer or perforated plate.

$G^3$ is a pipe through which soap-lye or brine containing less glycerine than the liquor adhering to the mineral crystals, or pure brine, can be admitted for the purpose of washing the crystals of the mineral deposits free from the glycerine liquor adhering to them, the deposits remaining upon the perforated plate or filter $G^2$, and the liquor passing through the perforated plate or filter and escaping by the pipe $G^4$, from which it may be collected for reuse in any convenient manner.

At the commencement of the operation the vessel A is filled with the soap-lye, which fills also the receptacle G, the communication between A and G being open, the pipes $G^3$ and $G^4$ being closed by suitable stop-cocks or equivalent devices. Then as the glycerine-liquor becomes more concentrated the precipitates as formed, instead of accumulating in the boiling liquor, pass into the receptacle G, it being remembered that the liquor in A is boiling while the liquor in G is quiescent, the crystals being thus removed, immediately as formed, from contact with the boiling liquor. The fresh glycerine-liquor which it is from time to time necessary to feed into the apparatus may be supplied from below through the pipe $G^4$ into the quiescent portion, where most of it displaces the old liquor by pushing it into the boiling portion and is itself only very gradually intermixed with the stronger liquor. As soon as the receptacle G is filled, or so far filled as may be desirable, with the deposited crystals the valve H is closed and the cocks $G^3$ and $G^4$ are opened, and after removing any excess of liquor through $G^4$ the washing is effected by passing the washing-liquor through the crystals by way of the cock $G^3$ and removing it through $G^4$. As soon as this washing is finished the valves $G^3$ and $G^4$ are closed, the door $G'$ opened, and the crystals freed from glycerine removed from G, and the door $G'$ again closed. The valve H can now be again opened and the process conducted as before, or the receptacle G may first be filled with another charge of the liquor to be evaporated previous to opening the valve H, the air in chamber G escaping during this operation by the vent $g$.

The apparatus shown in Fig. 1 is a very convenient form for use in small soap-factories where they have no separate apparatus for washing the mineral precipitates. The part G may be mounted with stirrers for the mixing of the salt with the washing-liquor, and the removal of the washing-liquor through $G^4$ may be effected by direct suction or without the employment of a vacuum-chamber, or by pressure of the washing-liquor, or air or similar pressure from above, or, where time is not of importance, by gravitation alone.

In Figs. 2 and 3 the operation is the same as before, excepting that the washing apparatus is dispensed with, the crystals falling through the valve H, as before, into the receptacle G, whence they may be removed through the door G', upon closing the valve H, to a separate washing apparatus.

The apparatus shown in Figs. 4 and 5 is similar to that of Figs. 2 and 3, excepting that the vessel A is closed in and provided with the mechanical scraper K, the action of which will be well understood without special description. $A^2$ represents the pipe by which the vapors escape or may be conveyed to a condenser with or without use of a vacuum or otherwise dealt with.

The apparatus shown in Fig. 6 has a breeches-pipe J connected to the bottom of the boiler, and with the branches of this are also connected the two receptacles G with two valves H, as clearly shown in the drawings. By this arrangement one of the receptacles may be in connection with the heated portion A of the apparatus, while the other is shut off by its valve H and can be cleared at leisure. This facilitates the continuous working of the process. The shape of the two said portions of the apparatus and the methods of applying heat to the liquor in the "boiling or concentrating portion" may be varied and the liquor may have been previously submitted to any appropriate chemical or mechanical treatment.

Having now fully described our invention and the manner in which the same is to be performed, what we claim, and desire to secure by Letters Patent, is—

1. In the recovery of glycerine from spent soap-lye, the herein-described process of concentrating or boiling the soap-lye or glycerine-liquor, which consists in maintaining one portion of the liquor under operation in a state of ebullition and the other portion quiescent, the two portions being connected or separable at will and the crystals or mineral matters liberated from solution in the boiling portion passing by gravity into the quiescent portion, substantially as specified.

2. In the recovery of glycerine from spent soap-lye, the herein-described process of concentrating or boiling the soap-lye or glycerine-liquor, which consists in maintaining one portion of the liquor under operation in a state of ebullition and the other portion quiescent, the two portions being connected or separable at will, and the crystals or mineral matters liberated from solution in the boiling portion passing by gravity into the quiescent portion, and removing said mineral matters from the quiescent portion without interrupting the process in the boiling portion, substantially as specified.

3. In the recovery of glycerine from spent soap-lye, the herein-described process of concentrating or boiling the soap-lye or glycerine-liquor, which consists in maintaining one portion of the liquor under operation in a state of ebullition and the other portion quiescent, the two portions being connected or separable at will, and the crystals or mineral matters liberated from solution in the boiling portion passing at once into the quiescent portion, separating the two said portions and washing said crystals or mineral matters and then removing them without interrupting the process in the boiling portion, substantially as specified.

4. In the recovery of glycerine from spent soap-lye, the herein-described process of concentrating or boiling the soap-lye or glycerine-liquor, which consists in maintaining one portion of the liquor under operation in a state of ebullition and the other portion quiescent, the two portions being connected or separable at will, and the crystals or mineral matters liberated from solution in the boiling portion passing at once into the quiescent portion, and removing said mineral matters and feeding in fresh liquor to form a new quiescent portion without interrupting the process in the boiling portion, substantially as specified.

5. In the recovery of glycerine from spent soap-lye, the herein-described process of concentrating or boiling the soap-lye or glycerine-liquor, which consists in maintaining one portion of the liquor under operation in a state of ebullition and the other portion quiescent, the two portions being connected or separable at will, and the crystals or mineral matters liberated from solution in the boiling portion passing at once into the quiescent portion, separating the said portions and washing said crystals or mineral matters and then removing them and feeding in fresh liquor without interrupting the process in the boiling portion, substantially as specified.

In testimony whereof we have hereto set our hands in the presence of two subscribing witnesses.

ALBERT DOMEIER.
OTTO CHRISTIAN HAGEMANN.

Witnesses:
FRANCIS W. FRIGOUT,
A. E. MOPOLD.